Patented Sept. 9, 1952

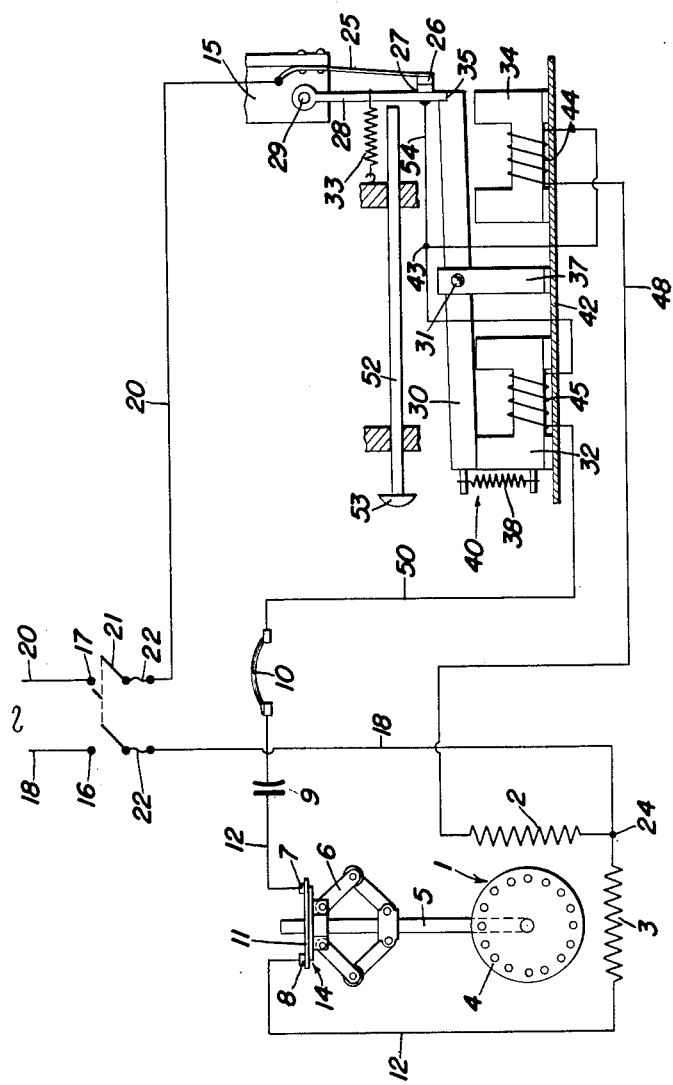

2,610,313

UNITED STATES PATENT OFFICE 2,610,313

PROTECTIVE ARRANGEMENT FOR
SINGLE PHASE MOTORS

Winifred J. Turnupseed, Porterville, and Harley
E. Turnupseed, Tulare, Calif.

Application March 23, 1950, Serial No. 151,492

8 Claims. (Cl. 318—221)

1

This invention relates to protective devices for induction motors and more specifically to protective devices for single phase motors of the so-called split phase type which are normally provided with a main or running winding and with a starting or auxiliary winding, the latter being arranged at an angle with respect to the main winding to produce a rotating field for starting purposes while, after starting, the motor may run on the main or running winding alone.

Electric motors of this type are extensively used in locations in which supervision or replacement of parts is difficult. The protective devices against overload and against burning of the windings such as normally used provide for effective protection only in certain frequently occurring cases of overload but do not offer protection against more infrequently occurring cases of overload or overheating and against the consequences of accidental defects of the equipment. However, where a large number of motors of this type is in use and also where the supervision and the accessibility meet with difficulties infrequent and even abnormal cases of overloading have to be considered. With large numbers of electric motors even infrequent cases of overheating or overloading become sufficiently frequent and important to warrant the use of installation giving full- and complete protection for all possible cases of overloading. The same viewpoint prevails in the case of motors of difficult accessibility on account of the amount of work entailed in reaching or demounting them.

It is the object of the present invention to provide a special protective device which, either alone or in conjunction with the existing protective equipment of the motor will provide protection against burning even in the infrequent cases of overloading of the windings with heavy currents which are capable of burning said windings.

It is a further object of the invention to provide a protective relay device with two relay units which are operable by current flowing in the circuits of the two windings of the motor respectively, the relay units acting on one and the same armature member and the flowing of current through both units causing a neutralization of the action of the relay while the flowing of current through one of the two windings causes the operation of the relay provided that the current exceeds a predetermined limit.

It is a further object of the invention to provide a protective relay arrangement for single phase motors with a running winding and a starting winding which is capable of discriminating

2 between overloads occurring normally during operational phases and overloads which are not connected with the normal operation of the motor, said discrimination being obtained by a plurality of relay units acting on the same armature in an opposite sense, said armature controlling the protective contacts and being only capable of operation if one of the relay units is cut out.

It is a further object of the invention to protect the motor by contacts held in their operative or closed position by an armature which is influenced by a plurality of relay units adapted to counterbalance each other, if energized simultaneously by the overload current, said units being arranged in parallel circuits, one of which is controlled by the starting and protective appliances of the A. C. motor, so that it is only operative during certain phases of the operation but is cut out during normal operation and upon the occurrence of overloads the duration of which exceeds a predetermined time.

It is a further object of the invention to provide a discriminating protective arrangement which is inoperative for overloads normally during certain operational phases, such as starting, but which is operative against overloads exceeding a predetermined value during other operational phases in which they do not normally occur, and which is especially responsive against overloads caused by a serious reduction of the rotational speed or by defects or malfunctions of the equipment of the motor.

Further objects of the invention will be apparent from the following detailed specification.

The invention is illustrated in the accompanying drawings by way of example. It is however to be understood that the example shown was selected in order to explain the principle of the invention and the best mode of applying said principle. The detailed specification does not provide a survey of all the modifications by means of which the invention may be carried into effect and a departure from the example shown in the drawing is therefore not necessarily a departure from the essence of the invention.

In the drawing a single figure shows diagrammatically the connections of a protective arrangement and the protective equipment which is used.

As above explained the invention provides protection for the usual type of induction motors of the single phase type which is customarily provided with a squirrel cage rotor and which is started by means of a starting winding energized at the start and producing a torque which sets the rotor running but disconnected when normal running conditions have been reached. The current flowing through the windings of the motor during the starting phase is very heavy as the windings form practically short circuits as long as no counterelectromotive force is generated. However, as soon as the rotor starts to rotate the armature reaction cuts down the current flow through the running winding and either this fact is utilized to cut out the starting winding by means of a switch, or a switch dependent on the rotational speed acquired by the motor cuts the starting winding circuit with the result that the current consumption of the motor is now governed by the load.

The protective arrangement therefore must permit a flow of heavy current during the starting phase but must become operative during the running or operative phase in the event that a heavy current is flowing in this phase. Moreover, the protective arrangement must become operative when overloads are slowing down the speed of the motor to such an extent that the starter switch is again operated and closed, a case which occurs frequently with motors having a starting switch operated by a centrifugal governor connected with the rotor shaft.

Also a number of other cases in which overloads occur must be taken care of, especially the case of an unexpectedly heavy load, such as a frozen pump or the like, which does not permit the motor to reach the rotational speed which is necessary for operating the starting switch which cuts out the starting winding. Likewise a number of defects, such as the failure of the governor to close the contacts, the interruption or breaking of the main winding circuit, and other infrequent but dangerous situations lead to a complete burning out of the winding of the motor.

According to the invention the protective arrangement consists essentially in a special protective or supervisory relay, cooperating with the usual protective equipment of the electric induction motor.

As will be seen in the diagram the usual and widely used squirrel cage induction motor 1 is provided with a main or running winding 2 and with an auxiliary or starting winding 3, arranged at right angles to each other and both acting on the rotor 4. The motor is provided with its normal starting and protective equipment guarding against overloads, this equipment being not part of the invention and being only shown to explain the cooperation with the protective relay arranged according to the present invention.

The starting device of the motor comprises a starting switch 14 which is driven by the motor shaft 5 acting on a centrifugal governor 6 which operates the contact plate or bar 11 bridging or connecting the switch contacts 7 and 8. The motor shaft in addition is coupled with a load device, a coupling which is not shown in the drawings. The auxiliary or starting winding 3 and the contacts of the centrifugal switch 14 are included in a starting circuit 12 which also contains the condenser 9 and a thermal switch 10 of the usual bimetallic type serving as an overload protection and also as a time delay device as usual.

The arrangement so far described is more or less a standard equipment which does not form part of applicant's invention.

The power is supplied from any suitable network or source of current. The said supply lines 18, 20 contain the terminals 16, 17 for connection to the customary double pole single throw switch 21 and the fuses 22. While one of the lines 18 may be directly connected with the junction point 24 of the two motor windings 2 and 3 the line 20 leads to the resilient contact spring 25 mounted on a block 15 and carrying the fixed contact 26 of a protective contact arrangement which cooperates with the contact 27 on the movable arm 28 which is controlled by the protective relay 40.

The resiliency of the spring 25 has the effect of keeping the contacts 26 and 27 applied against each other under a certain pressure as long as the arm 28 is in its normal position in which the contacts are closed and the motor may be operated.

The movable contact arm 28 is pivoted on the block 15 at 29 and is under the influence of the spring 33 which seeks to pull the arm 28 and its contact 27 away from the fixed contact 26.

The end of the movable contact arm 28 is held in a recess 35 of the armature 30 of the protective relay 40 when said armature is in its position of rest as shown in the figure. The armature 30 consists of a double armed lever pivoted at 31 in its center similar to the balance arm of a scale. The pivot 31 may be carried by post 37 mounted on a base plate 42. A spring 38 is arranged at one end of the armature and said spring has a tendency to keep the other end of the balance arm which is provided with the recess 35 applied against the movable contact arm 28 holding the latter against movement.

Below the two armed armature lever 30 two electro-magnetic relays 32, 34 are arranged which are both mounted on the base plate 42. Each relay is provided with a diagrammatically indicated core member and with a winding 44, 45 respectively. Both windings are connected at one end (at 43) with each other the junction point being connected with the movable contact 27 by means of conductor 54.

The windings, however, form part of separate circuits. The circuit of winding 44 runs from the junction point 43 over said winding to the running winding 2 and to junction point 24 between the windings 2 and 3. This circuit branch is designated by 48. The second circuit branch 50 also starts at junction point 43 and includes winding 45 of relay 32 and leads to the thermal bimetallic switch 10 which is connected with the circuit branch 12 of the starting winding 3.

The power exercised by the electromagnetic relay 34 and that exercised by the spring 38 must be finely adjustable so that the armature 30 may be attracted by relay 34 against the action of spring 38 only at a definite current intensity.

When the armature 30 is attracted by relay 34 against the tension of the spring 38 the arm 28 is released and snaps back under the action of its spring 33, thus cutting out the current supply to both windings of the motor and therefore stopping the motor and disconnecting it from the line.

After such a release by the relay 40 the arm 28 must be brought back into its locked position by means of the push rod 52 provided with a push button 53 operated manually.

The relay 40 protects the motor practically against all cases of possible overloading and overheating whatever the origin or nature of the overload.

In normal operation when switch 21 is closed current flows from line 20 over contact spring 25, contacts 26, 27 supported to be in their normal position shown in the drawing and over conductor 54 to junction point 43. The current path is divided from this point and one of the branches leads over winding 44, branch 48 and main winding 2 of the motor to point 24 and line 18. The other branch leads from junction point 43 over winding 45, circuit branch 50 and the thermal bimetallic switch 10 to the capacitor 9, to the contacts 7 and 8 of the centrifugal switch 14 and over circuit 12 to the starting or auxiliary winding 3 and to line 18.

The armature 30 does not move as it is attracted by relays 34 and 32 simultaneously and as it is held by spring 38.

When the motor starts by virtue of the rotary field set up in the same and reaches a certain rotational speed the governor 6 opens switch 14 at contacts 7 and 8 and the power supplied to the auxiliary winding 3 is thereby cut off. This interruption of the circuits 50, 12 de-energizes the relay winding 45 while relay winding 44 still remains energized. However, with the normal operational current of the electric motor now flowing through the running winding the relay 34 does not develop sufficient power to attract the armature 30 and to tilt it against the action of the spring 38.

The usual protection of the motor is mostly effective against overloads manifesting themselves in an increase of the current supplied to the motor. The relay 34 takes care of this protection by virtue of the adjustment of the ampere-turns of the relay and of the spring 38. When the current supplied to the electric motor increases to such an extent that the ampere-turns of winding 44 produce a magnetic field overcoming the spring tension of spring 38 the armature 30 is attracted and the arm 28 snaps back and cuts the current supply to the electric motor. In addition to this type of protection further protection is also obtained in the event that the load slows the speed of the electric motor materially while the current is only rising at a slower rate. In this case the slowing down of the rotational speed produces a falling back of the governor 6 and a closing of the switch 14 while the relay 34 is not yet in a position to overcome the tension of the spring 38. In this case current flows through winding 45 over the circuit branches 12 and 50 as the branch 12 has now been closed by the governor 6. This brings the thermal bimetallic switch 10 into the circuit which is now heated by the increased current and which will again interrupt the circuit 50. In the meantime the current through the electromagnetic relay 44 has also increased and by the time the thermostat 10 cuts off circuit 50, the armature 30 is attracted and the motor is cut out.

Protection against a burning of the auxiliary winding in the event of a broken circuit in the running or main winding during the period when the starting winding is energized is provided by the thermostatic switch 10 interrupting the circuit of the auxiliary winding when the current is too heavy.

Protection against a burning of one of the windings in the case of jamming of the load or of the rotor or in the case of other reasons preventing the motor from getting proper rotational speed is provided by the fact that in this case the heavy current flowing through the circuit 12, 50 which remained closed on account of the insufficient speed of the rotor shaft 5 operates the thermal bimetallic switch 10 and therefore interrupts the circuit 50 while at the same time the heavy current flowing through the circuit 48 operates relay 44 thus attracting the armature 30 and releasing the contact lever 28.

Protection against accidents, such as the freezing of water pumps driven by the motor or the like is furnished in approximately the same manner as both windings in this case are heavily overloaded when the motor cannot start.

Protection against failure of the governor to operate properly in keeping the contacts open instead of closing them when the shaft 5 is at rest or at slow speed must also be provided as this defect may cause one of the windings to burn out. The protection is furnished by the heavy current flowing through the main or running winding 2 in such a case which operates the armature 30 and therefore the contact arm 28. The same conditions occur practically if the contacts of the governor are soiled or if the capacitor 9 or the thermal switch 10 is defective and opens the circuit.

It will thus be seen that a combination of the relay, as described, with the usual protective arrangement and especially the connection of the two circuits of the main and of the auxiliary winding respectively with the two relay units of the relay arrangement 40 provides protection against all defects in the circuits of the motor and protection against overloads under all possible conditions.

It will also be seen that some of the features which have been described may be changed without departing from the essence of the invention.

Having described the invention, what is claimed as new is:

1. A protective device for A. C. motors having a running winding and a starting winding and a starting switch comprising current supply lines for said motor, two parallel circuits, each including one of said windings, connected across said supply lines, the circuit of the starting winding also including said starting switch, a thermal overload protective switch in the last named circuit, a protective interrupter in the supply line connected with said circuits, said interrupter including normally closed interrupter contacts and means including a plurality of relay units for operating said contacts, one of said units being an operative unit adapted to operate said means upon occurrence of an overload current in said motor, another unit being a counterbalancing unit, adapted to prevent the operation of said protective means if the overload current flows through both circuits, but restoring the control of the protective means by the first named unit, upon interruption of the starting winding circuit by the starting switch or the thermal overload protection switch.

2. A protective device for A. C. motors having a running winding and a starting winding comprising current supply lines for said motor, a pair of circuits, each including one of said windings, a relay arrangement with two relay units, each circuit including one of said units, an armature for said relay arrangement controlled by both relay units, said armature being operable only upon energization of one of said units, and protective control contacts for the current supply lines to the motor, said contacts being opened upon operation of said armature.

3. A protective device for A. C. motors having a running winding and a starting winding, comprising current supply lines for said motor, a separate circuit for each of said two windings, said circuits branching off from said supply lines, normally closed protective contacts in one of said lines, a relay arrangement with two relay units, each of said branch circuits including one of said two relay units, a common armature for both relay units, said armature biased in an opposite sense by the two units, and means for operating the protective contacts upon operation of the armature.

4. A protective device for A. C. motors having a running winding, a starting winding, a starting switch and a protective thermal switch, comprising current supply lines for said motor, two circuits connected across the supply lines, each of said circuits including one of said windings, the circuit including the starting winding also including the starting switch and the protective thermal switch, normally closed protective contacts in the supply line connected with the aforesaid circuits, a protective relay arrangement provided with a single armature and with two relay units, said relay units acting on the said armature in opposite directions, each relay unit being included in one of the said two circuits, one of the relay units included in the circuit leading to the running winding being adapted to operate the armature, said armature upon operation controlling the opening of the normally closed protective contacts, the energization of the relay unit included in the starting winding circuit being controlled by the starting switch and the thermal switch of the motor included in said starting winding circuit.

5. A protective device for A. C. motors having a running winding, a starting winding, a starting switch and a protective thermal switch, comprising current supply lines for said motor, two branch circuits connected across the supply lines, each of said circuits including one of said windings, the circuit including the starting winding also including the starting switch and the protective thermal switch, normally closed protective contacts in the supply line connected with the aforesaid circuits, a protective relay arrangement including a single armature and with two relay units, said relay units acting on the said armature in opposite directions, each of said branch circuits including one of relay units, a tensioning element for biasing said armature, and for holding it in its position until operated by a predetermined force, the relay unit included in the circuit including the running winding being operative to counteract the tensioning element, so as to operate the armature to release the contacts, biasing means connected with said contacts for opening said contacts when released.

6. In a motor having a running winding, a starting winding, a starting switch and a thermal protective switch for said starting winding, supply line for said motor, a protective device for said motor comprising a contact controlling said supply line, means biasing said contact to open position, a latch including a pivoted armature normally retaining said contact in closed position, means biasing said armature into latching position, a pair of relay units cooperating with said armature, a pair of parallel circuits for energizing said motor, one of said circuits including in series circuit relation the starting winding, the starting switch, the thermal protective switch and one of said relay units, the other circuit including in series circuit relation said running winding and the other of said relay units, the relay unit in series with said starting winding acting when energized to produce a bias retaining said armature in latching position, the relay unit in series with said running winding when energized tending to move said armature to release said contact.

7. In a motor having a running winding, a starting winding, a starting switch, a supply line for said motor and a pair of motor circuits connected across said supply line, a protective device comprising a contactor in said supply line, a relay controlling said contactor, said relay including an armature, a pair of relay units acting on said armature, means biasing said armature into latching relation with said contactor, one of said motor circuits including the running winding and the first of said relay units, over current in said running winding energizing said first relay unit to overcome the bias and move said armature to release said contactor, the other motor circuit including said starting winding and the second relay unit, said second relay unit when energized producing a bias overbalancing said first relay unit.

8. In a split-phase motor having a running winding, a starting winding, a starting switch and a supply line for said motor, a pair of motor circuits connected across said supply line, a protective device for said motor comprising a contactor in said supply line in advance of said motor circuits, means biasing said contactor to open position, a latch for said contactor including a pivoted armature, means biasing said armature into latching position, a pair of relay units cooperating with said armature, one of said motor circuits including in series circuit relation the starting winding, the starting switch and one of said relay units, the other motor winding including in series circuit relation the running winding and the other said relay units, overload current in said circuit including the running winding energizing said relay to move said armature to release said contactor and current in said circuit including the starting winding energizing said relay to retain the armature in latching position.

WINIFRED J. TURNUPSEED.
HARLEY E. TURNUPSEED.

REFERENCES CITED

The following references are of record in the file of this patent:

UNITED STATES PATENTS

| Number | Name | Date |
|---|---|---|
| 1,600,775 | Peaslee | Sept. 21, 1926 |
| 1,651,486 | Tolin | Dec. 6, 1927 |
| 2,166,323 | Raney | July 18, 1939 |
| 2,318,076 | Johns | May 4, 1943 |